(12) United States Patent
Moy et al.

(10) Patent No.: US 6,294,144 B1
(45) Date of Patent: *Sep. 25, 2001

(54) METHODS AND CATALYSTS FOR THE MANUFACTURE OF CARBON FIBRILS

(75) Inventors: David Moy, Winchester; Asif Chishti, Lowell, both of MA (US)

(73) Assignee: Hyperion Catalysis International, Inc., Cambridge, MA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/464,278

(22) Filed: Jun. 5, 1995

Related U.S. Application Data

(62) Division of application No. 08/284,742, filed on Aug. 2, 1994, now abandoned, which is a continuation of application No. 07/887,307, filed on May 22, 1992, now abandoned.

(51) Int. Cl.⁷ .......................................................... D01F 9/12
(52) U.S. Cl. ..................................... 423/447.2; 423/447.3
(58) Field of Search .............................. 423/447.2, 447.3

(56) References Cited

U.S. PATENT DOCUMENTS

| | | | |
|---|---|---|---|
| 2,984,653 | 5/1961 | Witt | 502/170 |
| 4,119,567 | 10/1978 | Bartsch | 502/170 |
| 4,663,230 | 5/1987 | Tennent | 428/367 |
| 5,165,909 | 11/1992 | Tennent et al. | 502/182 |
| 5,578,543 | * 11/1996 | Tennent et al. | 423/447.3 |

FOREIGN PATENT DOCUMENTS

| | | | |
|---|---|---|---|
| 2249783 | 5/1992 | (GB) | 502/170 |
| 1225327 | 10/1986 | (JP) . | |
| 1298214 | 12/1989 | (JP) . | |
| WO 89/07163 | 8/1989 | (WO) . | |
| WO 90/07023 | 6/1990 | (WO) . | |

* cited by examiner

Primary Examiner—Stuart L. Hendrickson
(74) Attorney, Agent, or Firm—Barry Evans, Esq.; Kramer Levin Naftalis & Frankel LLP

(57) ABSTRACT

An improved catalyst for producing carbon fibrils is made by incorporating an effective yield-enhancing amount of a carboxylate into a fibril-forming catalyst. Alternatively, such a catalyst is made by coprecipitating a compound of a metal having fibril-forming catalytic properties and an aluminum and/or magnesium compound, optionally in the presence of carbon particles or carbon fibril aggregates. The catalyst may also be made by incorporating a compound of a fibril-forming metal onto magnesia particles in carbon particles or carbon fibril aggregates. The catalysts, methods of using them to form carbon fibrils and those carbon fibrils are also disclosed.

56 Claims, No Drawings

METHODS AND CATALYSTS FOR THE MANUFACTURE OF CARBON FIBRILS

This is a Request for filing a divisional application under 37 CFR § 1.60 of pending prior application Ser. No. 08/284742, filed on Aug. 2, 1994 now abandoned, which is a continuation of application Ser. No. 07/887,307, filed May 22, 1992 now abandoned by David Moy and Asif Chishti, and currently entitled IMPROVED METHODS AND CATALYSTS FOR THE MANUFACTURE OF CARBON FIBRILS.

BACKGROUND OF THE INVENTION

Carbon fibrils are vermicular carbon deposits having diameters less than 500 nanometers. They exist in a variety of forms, and have been prepared through the catalytic decomposition of various carbon-containing gases at metal surfaces.

Tennent, U.S. Pat. No. 4,663,230, describes carbon fibrils that are free of a continuous thermal carbon overcoat and have multiple graphitic outer layers that are substantially parallel to the fibril axis. They generally have diameters no greater than 0.1 micron and length to diameter ratios of at least 5. Desirably they are substantially free of a continuous thermal carbon overcoat, i.e., pyrolytically deposited carbon resulting from thermal cracking of the gas feed used to prepare them.

Tubular fibrils having graphitic layers that are substantially parallel to the microfiber axis and diameters between 3.5 and 75 nanometers, are also described in Tenant et al., U.S. Ser. No. 871,676 filed Jun. 6, 1986 ("Novel Carbon Fibrils, Method for Producing Same and Compositions Containing Same"), Tenant et al., U.S. Ser. No. 871,675 filed Jun. 6, 1986 ("Novel Carbon Fibrils, Method for Producing Same and Encapsulated Catalyst"), Snyder et al., U.S. Ser. No. 149,573 filed Jan. 28, 1988 ("Carbon Fibrils"), Mandeville et al., U.S. Ser. No. 285,817 filed Dec. 16, 1988 ("Fibrils"), and McCarthy et al., U.S. Ser. No. 351,967 filed May 15, 1989 ("Surface Treatment of Carbon Microfibers"), all of which are assigned to the same assignee as the present application and are hereby incorporated by reference.

Fibrils are useful in a variety of applications. For example, they can be used as reinforcements in fiber-reinforced composite structures or hybrid composite structures (i.e. composites containing reinforcements such as continuous fibers in addition to fibrils). The composites may further contain fillers such as a carbon black and silica, alone or in combination with each other. Examples of reinforceable matrix materials include inorganic and organic polymers, ceramics (e.g., lead or copper). When the matrix is an organic polymer, it may be a thermoset resin such as epoxy, bismaleimide, polyamide, or polyester resin; a thermoplastic resin; or a reaction injection molded resin. The fibrils can also be used to reinforce continuous fibers. Examples of continuous fibers that can be reinforced or included in hybrid composites are aramid, carbon, and glass fibers, alone or in combination with each other. The continuous fibers can be woven, knit, crimped, or straight.

The composites can exist in many forms, including foams and films, and find application, e.g., as radiation absorbing materials (e.g., radar or visible radiation), adhesives, or as friction materials for clutches or brakes. Particularly preferred are fibril-reinforced composites in which the matrix is an elastomer, e.g., styrene-butadiene rubber, cis-1,4-polybutadiene, or natural rubber.

In addition to reinforcements, fibrils may be combined with a matrix to create composites having enhanced thermal, and/or electrical conductivity, and/or optical properties. They can be used to increase the surface area of a double layer capacitor plate or electrode. They can also be formed into a mat (e.g., a paper or bonded non woven fabric) and used as a filter, insulation (e.g., for absorbing heat or sound), reinforcement, or adhered to the surface of carbon black to form "fuzzy" carbon black. Moreover, the fibrils can be used as an adsorbent, e.g., for chromatographic separations.

Fibrils are advantageously prepared by contacting a carbon-containing gas with a metal catalyst in a reactor at temperature and other conditions sufficient to produce them with the above-described morphology. Reaction temperatures are 400–850° C., more preferably 600–750° C. Fibrils are preferably prepared continuously by bringing the reactor to the reaction temperature, adding metal catalyst particles, and then continuously contacting the catalyst with the carbon-containing gas.

Examples of suitable feed gases include aliphatic hydrocarbons, e.g., ethylene, propylene, propane, and methane; carbon monoxide; aromatic hydrocarbons, e.g., benzene, naphthalene, and toluene; and oxygenated hydrocarbons.

Preferred catalysts contain iron and, preferably, at least one element chosen from Group V (e.g., molybdenum, tungsten, or chromium), VII (e.g., manganese), or the lanthanides (e.g., cerium). The catalyst, which is preferably in the form of metal particles, may be deposited on a support, e.g., alumina and magnesia.

The carbon fibrils have a length-to-diameter ratio of at least 5, and more preferably at least 100. Even more preferred are fibrils whose length-to-diameter ratio is at least 1000. The wall thickness of the fibrils is about 0.1 to 0.4 times the fibril external diameter.

The external diameter of the fibrils preferably is between 3.5 and 75 nanometers, i.e. determined by the particular application envisioned) have diameters within the range of 3.5–75 nanometers. Preferably a large proportion have diameters falling within this range. In applications where high strength fibrils are needed (e.g., where the fibrils are used as reinforcements), the external fibril diameter is preferably constant over its length.

Fibrils may be prepared as aggregates having various macroscopic morphologies (as determined by scanning electron microscopy) in which they are randomly entangled with each other to form entangled balls of fibrils resembling bird nest ("BN"); or as aggregates consisting of bundles of straight to slightly bent or kinked carbon fibrils having substantially the same relative orientation, and having the appearance of combed yarn ("CY") e.g., the longitudinal axis of each fibril (despite individual bends or kinks) extends in the same direction as that of the surrounding fibrils in the bundles; or, as, aggregates consisting of straight to slightly bent or kinked fibrils which are loosely entangled with each other to form an "open net" ("ON") structure. In open net structures the degree of fibril entanglement is greater than observed in the combed yarn aggregates (in which the individual fibrils have substantially the same relative orientation) but less than that of bird nest. CY and ON aggregates are more readily dispersed than BN making them useful in composite fabrication where uniform properties throughout the structure are desired. The substantial linearity of the individual fibril strands also makes the aggregates useful in EMI shielding and electrical applications.

The macroscopic morphology of the aggregate is controlled by the choice of catalyst support. Spherical supports grow fibrils in all directions leading to the formation of bird nest aggregates. Combed yarn and open nest aggregates are prepared using supports having one or more readily cleavable planar surfaces, e.g., an iron or iron-containing metal catalyst particle deposited on a support material having one or more readily cleavable surfaces and a surface area of at least 1 square meters per gram.

Preferred support materials include activated alumina or magnesia in the form of aggregates of tabular, prismatic, or platelet crystals. Such material is commercially available, e.g., from ALCOA (in the case of activated alumina) and Martin Marietta (in the case of magnesia). The activated alumina supports yield primarily combed yarn aggregates, while the magnesia supports yield primarily open net aggregates. Spherical gamma alumina particles, which yield bird nest aggregates, are available from Degussa.

It is believed that deposition of a catalyst on a support consisting of readily cleavable planar surfaces allows the fibrils to assist each other as they grow, creating a "neighbor" effect. As the catalyst particles deposited on the flat surfaces initiate fibril growth, the individual fibrils are influenced by their "neighbors". In the case of the activated alumina support, this leads to a combed yarn fibril aggregate in which the individual fibrils have the same relative orientation. The magnesia supports, although having readily cleavable planar surfaces, yield primarily lightly entangled, open net fibril aggregates because they break apart more readily into smaller particles than the activated alumina support during fibril growth, resulting in aggregates that are less ordered than the combed yarn aggregates but more ordered than the tightly entangled fibril balls. The oxide precursors used to generate the metal catalyst particles also affect the tendency of the support to break apart. The more readily the oxide and support can form a mixed oxide at the interface between them, the more likely the support is to break apart.

Further details regarding the formation of carbon fibril aggregates may be found in the disclosure of Snyder et al., abandoned U.S. patent application Ser. No. 149,573, filed Jan. 28, 1988, and PCT Application No. U.S. Ser. No. 89/00322, filed Jan. 28, 1989 ("Carbon Fibrils") WO 89/07163, and Moy et al., abandoned U.S. patent application Ser. No. 413,837 filed Sep. 28, 1989 and PCT Application No. U.S. Ser. No. 90/05498, filed Sep. 27, 1990 ("Fibril Aggregates and Method of Making Same") WO 91/05089, all of which are assigned to the same assignee as the invention here and are hereby incorporated by reference.

Fibrils are increasingly important in a variety off industrial uses and will become more so as these unique properties become better understood and exploited. While known methods of manufacture permit production of small quantities of fibrils, it is important to improve these methods, and in particular the catalysts used in those methods, to increase the yield of fibrils, to improve their quality and to lower their cost of production. It is also desirable to produce carbon fibrils of improved-purity.

OBJECTS OF THE INVENTION

It is thus a primary object of the invention to provide improved catalysts for the production of fibrils.

It is a further object of the invention to increase the yield and productivity of fibril-producing catalysts.

It is still a further object of the invention to provide improved methods of preparing fibril-producing catalysts.

It is yet another object of this invention to improve the quality and uniformity of fibrils and aggregates thereof.

It is a further and related object of the invention to provide catalysts which lend themselves to large-scale fibril-producing processes.

It is still a further and related object of the invention to improve the economics and reliability of fibril manufacture

SUMMARY OF THE INVENTION

Methods have now been found which substantially improve the yield of catalysts for the manufacture of carbon fibrils and carbon fibril aggregates. Substantially improved yields can be obtained by contacting a fibril-forming catalyst with an effective yield-enhancing amount of a carboxylate, such as a lower carboxylic acid or a salt thereof. The method is preferably carried out by precipitating an effective amount of a fibril-producing metal ion from an aqueous solution onto slurried particles of a support material in the presence of a carboxylate, such as an anion of a water-soluble carboxylic acid, preferably having 1 to 4 carbon atoms.

Another method which has been found to substantially improve the manufacture of catalysts for the production of carbon fibrils and fibril aggregates includes the step of coprecipitating a compound of a metal having fibril-forming catalytic properties and an aluminum or magnesium compound under controlled pH conditions to form a catalyst comprising a compound of aluminum or magnesium and a compound of the metal(s). Desirably an aqueous solution of an iron and/or molybdenum salt and an aluminum salt is formed and the metals coprecipitated to form a mixed oxide catalyst.

It has also been found that fibril-forming catalysts may be advantageously supported on carbon particles and desirably on carbon fibril aggregates composed of carbon fibrils of particular characteristics. In these aggregates, a preponderance of the fibrils have a length to diameter ratio of at least 5, an external diameter from 3.5 to 75 nanometers and a wall thickness of 0.1 to 0.4 times the external diameter. The fibrils have graphitic layers substantially parallel to the fibril axis and are substantially free of pyrolytically deposited carbon. The active fibril-forming metal is desirably iron or iron and molybdenum and preferably these active metal catalysts are deposited on the fibril aggregates as mixed oxides with alumina or magnesia as described above.

The improved methods of making fibril-forming catalysts and the improved catalysts themselves substantially increase the yield of fibrils per unit of fibril-forming catalytic metal. Carboxylate treatment during the making of fibril-forming catalysts yields catalysts with higher productivity. Coprecipitation of catalyst metals(s) and aluminum or magnesium compounds provides catalyst with higher loadings of active netal(s) and therefore higher productivities. Further, use of fibril aggregates as catalyst supports lend themselves to large scale fibril producing processes. The improved catalysts of the invention can be used to produce not only fibrils such as are described in Tennent, U.S. Pat. No. 4,663,230—although the fibrils of the invention have higher purity as made—but also fibrils having different macromorphologies, such as the so-called fishbone ("FB") morphology as described in published European Patent Application No. 198,558 to J. W. Geus (published Oct. 22, 1986).

DETAILED DESCRIPTION OF THE INVENTION

The term "fibril-forming catalyst" is used to refer collectively to catalysts for forming discrete carbon fibrils, carbon fibril aggregates or both.

The term "carbon fibrils" when referring to products is used to refer collectively to both discrete carbon fibrils and carbon fibril aggregates, unless the context indicates a different meaning.

Carboxylate Treatment

Catalysts for producing carbon fibrils are made by incorporating an effective yield-enhancing amount of an anion capable of an anion exchange reaction with OH-groups, such ass a carboxylate or a phenolate into a catalyst. Accordingly, catalysts for the production of carbon fibrils can be obtained by precipitating an effective amount of a compound of a fibril-producing metal, e.g. iron or iron and molybdenum, from an aqueous solution onto slurried particles of a support in the presence of an effective, yield-enhancing amount of a carboxylate. Preferably the carboxylate may generally be an anion of a water-soluble carboxylic acid, such as a substituted or unsubstituted, mono-, di-, tri- or polycarboxylic acid, preferably a water-soluble monocarboxylic acid having 1 to 4 carbon atoms, or an aqueous emulsion of a nonwater-soluble carboxylic acid with an emulsifier.

In alternative embodiments the carboxylate may be present in undissociated form provided that the carboxylate is capable of reacting with or otherwise affecting the surface properties of the metal oxide or metal hydroxide catalyst support. Hence, the carboxylate can be used in a nonagueous solvent system that is also amenable to use as the solvent system in the formation of fibril-forming catalysts, such as, for example, an alcohol solvent system.

The carboxylate may be in the form of a hydrogen (i.e., carboxylic acid), sodium, potassium, ammonium or substituted ammonium, such as N-alkyl ammonium, carboxylate.

Desirably the anion is acetate or formate and is obtained from a water soluble salt of formic acid or acetic acid. Other carboxylates include propionates, butyrates, oxalates, citrates and tartrates.

A preferred form of the carboxylate is as the ammonium salt because ammonium ion is destroyed upon drying. Other carboxylate salts such as sodium, potassium and substituted quaternary ammonium, such as N-alkyl ammonium, may also be used.

A preferred method of carboxylate treatment includes the steps of (a) forming an aqueous solution of iron or iron and molybdenum salts, (b) forming a slurry of a catalyst support, e.g. alumina and or magnesia, (c) precipitating an iron compound or iron and molybdenum compounds onto the slurried particles; of alumina and/or magnesia in the presence of an effective yield-enhancing amount of the carboxylate, preferably the anion of a lower carboxylic acid, at a pH at which precipitation is initiated and the precipitate maintained in insoluble form and generally in the range of 3 to 14, preferably 5.5–6.5, and (d) further processing it to produce the fibril-forming catalyst. Such further processing may comprise separating the so-impregnated support material from the slurry, drying it and finely dividing it or injecting the slurry directly into the reaction vessel for in situ conversion into catalyst.

In a preferred alternative embodiment, the method includes the steps of (a) forming an aqueous solution of iron or iron and molybdenum salt, (b) forming a solution of catalyst support precursor, such as an aluminum or magnesium salt, (c) mixing these two solutions and coprecipitating a mixed oxide catalyst in the presence of carboxylate and (d) separating the coprecipitated mixed oxide catalyst and further processing it. In a variant of this method, the alumina or magnesia support itself is formed in the presence of carboxylate and the catalyst is then precipitated onto the thus-created support from an aqueous solution of the catalyst precursor(s).

Desirably the solution from which the compounds of fibril-forming metal are precipitated onto the slurried particles of support particles contains from 0.04 to 4 grams of the anion of the carboxylic acid per gram of supported fibril-forming catalyst and preferably from 0.8 to 2 grams. Where iron or iron and molybdenum is the active fibril-forming metal, the weight ratio of anion of carboxylic acid to iron or iron and molybdenum in the solution from which the iron or iron and molybdenum is precipitated is broadly in the range of 0.07 to 14 and preferably is in the range of 1.4 to 5.2.

In preferred embodiments where the carboxylic acid is acetic acid, the weight ratio of acetate to iron in the solution is in the range of 0.1 to 5. Acetate is the preferred anion when precipitation is carried out at a controlled pH among other reasons because solutions thereof act as buffers.

The precipitated metal on catalyst support is filtered and may be washed and reslurried and then vacuum or pressure filtered. The washed and filtered slurry is then dried and may be ground to −100 mesh and thereafter tested for productivity. The catalyst is activated by reduction of the compounds of fibril-forming catalyst metal to the corresponding catalyst metal. The catalyst can also be prereduced prior to use.

It has been found that it is advantageous to introduce the carboxylate salt, e.g. of acetic or formic acid, into the slurry of the support material prior to its combination with the solution containing the active fibril-forming metal compound.

While the precipitation procedure works best if the carboxylate is present in the slurry of catalyst support material, e.g. alumina, the support material can also be pretreated with a solution of carboxylate and then dried before the iron or iron and molybdenum salt is precipitated thereupon. A post-precipitation contact with carboxylate is less effective, but still provides improved results over catalysts without carboxylate treatment.

On magnesia-supported catalysts, still other procedures for treating with carboxylate work well. For example, washing a magnesia-supported catalyst with 1N ammonium acetate after precipitation of the iron or iron and molybdenum compound(s), i.e. a post-precipitation method, has a strong positive effect on catalyst productivity.

While not wishing to be bound by any theory, it is believed that the carboxylate acts by exchanging with surface hydroxyl ions to alter the surface characteristics of the support material. This, in turn, can strongly affect the attachment of the small iron oxide or iron/molybdenum oxide particles to the surface of the support. With magnesia supports, the ion exchange can be accomplished efficiently by washing after the iron oxide or iron and molybdenum oxides have been deposited. It is believed that surface modification of the support by carboxylate can be beneficial to the catalyst in two ways. First, the carboxylate, by affecting the attachment of the metal oxide particles to the surface, makes the subsequent reduction and activation of those particles take place more efficiently. Secondly, the surface modification changes the friability characteristics of the support surface which can have a beneficial effect.

The improvement in yield achieved with carboxylate-treated catalysts ranges from about 10 to 20% when preparing bird nest (BN) type fibril aggregates to about 100% when producing combed yarn (CY) or open net (ON) type fibril aggregates.

Co-Precipitation

Improved fibril-making catalysts can be obtained by coprecipitating the mixed oxide(s) of fibril-forming active metal and a precursor of a second oxide, e.g. aluminum oxide or magnesium oxide. In a preferred embodiment an aqueous solution is formed comprising (i) a salt(s) of one or more metal(s) having fibril-forming catalytic properties and (ii) an aluminum and/or magnesium salt(s). The fibril-forming metal(s) and the aluminum and/or magnesium are coprecipitated from the aqueous solution as the mixed oxides of the metal(s) and aluminum and/or magnesium and thereafter the precipitate is filtered, washed, dried and ground as is known in the art.

Desirably the fibril-forming metal catalysts are iron or iron and molybdenum and these are precipitated by the addition of a base such as ammonium carbonate or sodium carbonate at a pH sufficient to initiate precipitation and to maintain the precipitate in insoluble form. The pH is generally in the rang of from 3 to 14 and preferably is in the range of 5.5 to 6.5. Precipitation preferably is carried out in the presence of a yield-enhancing amount of an anion of a water-soluble carboxylic acid.

The solution from which the iron compound or iron and molybdenum compounds are precipitated desirably contains from 0.01 to 1 gram of iron, preferably from 0.3 to 0.5 gram; from 0.005 to 0.25 gram of molybdenum, preferably from 0.06 to 0.1 gram; and from 0.1 to 1 gram of aluminum and/or magnesium, preferably from 0.2 to 0.5 gram, per gram of finished fibril-forming catalyst. The pH is sufficient to maintain the iron compound or iron and molybdenum compounds in solution is broadly from 0 to 3 and preferably from 0 to 1.

Carbon Supports

Carbon particles having a high degree of structure and an open pore structure with high surface area can be used as supports for the mixed oxide catalysts of the invention. Carbon particles having a high porosity, i.e., a low bulk density, and a high surface area are said to have a high degree of structure.

Carbon particles that are essentially pure carbon are preferred since they add the least amount of contamination to the final fibril product. Examples of these materials are (1) carbon blacks available from Cabot Corp., such as the REGAL, VULCAN, MONARCH and ELFTEX series of carbon blacks described in Cabot Technical Report S-134 and (2) vapor-grown carbon fibers, such as reported by M. Endo, et al. in "The Extended Abstracts of the 18th Biennial Conference on Carbon", Worcester, Mass. (American Carbon Society, University Park) at p. 151; by G. G. Tibbits, ibid. at p. 157, by Asahi Chemical Ind K K in Japanese Patent No. 62-263,377 (May 6, 1986), by Showa Denka K K in Japanese Patent No. 62-078,217 (Sep. 26, 1985); or by Nikkiso K K in Japanese Patent No. 61-070014 (Apr. 10, 1986). These carbon fiber materials may also include pyrolytically deposited carbon and, optionally, may be graphitized in a further processing step at >2500°C. Commercially available reinforcement fibers, e.g., those made from poly (acrylonitrile) fibers, are also candidates. Any such material should be selected so as not to adversely affect the properties of the fibrils made using the material as a catalyst support.

More preferred are carbon particles as described above with high surface area, i.e. >250 m$^2$/g, since these are more amenable to use as catalyst supports, i.e, they possess the surface area, porosity, pore structures and handleability necessary to prepare catalysts for commercial operation. Examples of these materials are the activated carbons and activated charcoals, such as the WV-B, WV-W, WV-L, or WV-G series materials available from Westvaco or the MONARCH BLACK PEARLS or VULCAN XC72 materials available from Cabot Corp.

Most preferred are carbon fibril aggregates since they combine the high purity and high surface area of the materials mentioned above and, additionally, present a uniquely high macro-porosity (up to 8 cc/g) with an open pore structure, i.e, a pore structure with essentially no micropores (diameters >2 nm). Micropores often render the internal surface area of a carbon material inaccessible to reactants because of diffusion limitations and make the particle often subject to plugging. Fibril aggregates with their unique porosity and relative absence of micropores do not suffer this shortcoming. Excellent results are obtained with fibril aggregates as supports for the mixed oxides of fibril-forming metal(s) and aluminum or magnesium.

The alumina or magnesia can be formed in situ using the fibril aggregate as the sole support, or, aluminum or magnesium oxides can be added to the aggregates as a well-dispersed slurry before deposition of the active metal catalysts. The coprecipitation procedure described above for iron oxide or iron and molybdenum oxide and aluminum oxide may be carried out in the presence of the carbon particles or fibril aggregates. Where an aluminum and/or magnesium compound and the fibril-forming metal are coprecipitated onto an aggregate or carbon particle support, the aqueous solution of fibril-forming metal and an aluminum and/or magnesium compound contains from 0.01 to 1, preferably 0.2 to 0.5, gram of iron, from 0.005 to 0.25, preferably 0.05 to 0.1, gram of molybdenum and from 0.01 to 1, preferably from 0.2 to 0.5, gram of aluminum and/or magnesium per gram of supported fibril-forming catalyst and the slurry of fibril aggregates or carbon particles has from 0.01 to 0.9, preferably from 0.4 to 0.7, gram-of aggregate or carbon particles per gram of supported fibril-forming catalyst.

The aggregates are, for example, the BN, CY or ON aggregates described above although other aggregates are also useful, including aggregates of fishbone ("FB") morphology characterized by a crystalline graphitic structure and a morphology defined by a fishbone-like arrangement of the graphite layers along the axis of the filaments. Fibril aggregates are desirable owing to their high surface area e.g., from about 250 to about 1000 m$^2$/gram and preferably greater than about 250 m$^2$/gram, and their unique macroscopic porosity of up to about 8 cc/gram, or typically in excess of 1 cc/gram and preferably in excess of 5 cc/gram.

It has been found that an effective catalyst cannot be prepared by separately coprecipitating the mixed metal oxides and then physically mixing them with fibril supports. The latter procedure results in a mixture of materials having greatly different bulk densities such that when the mixtures are filtered, the solids partially separate and a non-homogenous mixture is obtained.

Coprecipitation in the presence of fibril aggregates gives a uniform homogenous distribution of active catalyst strongly attached either chemically or physically to the aggregate. It is thought that the small particles of the metal oxides and the alumina and/or magnesia deposit in the crevices and pores of the intertwining carbon fibrils in the fibril aggregate and become strongly fixed thereto. The alumina or magnesia provides for the stable deposition of the iron oxide or iron and molybdenum oxides. Were it not present, the iron and molybdenum particles formed by reduction of the oxides would be too mobile on the graphite surface of the fibril aggregate at the temperatures required for fibril growth and would fuse into large particles and deactivate before starting to grow carbon fibrils.

A significant advantage of coprecipitation in the presence of fibril aggregates, or, to a lesser extent, incorporating a fibril-forming metal onto magnesia particles in fibril aggregates, is that the amount of alumina or magnesia in the catalyst is significantly reduced. This decrease results in a higher yield of carbon fibrils based on alumina or magnesia content and decreases the amount of alumina or magnesia impurity included in the product. While the amount of alumina or magnesia decreases, the yield per unit of fibril-forming metal remains the same. The amount of washing that is needed to remove alumina or magnesia from the carbon fibril product is also reduced.

Where magnesia is used, catalysts can be made by finely dispersing magnesium oxide with fibril aggregates or carbon particles in water to form a slurry and adding a solution of iron or iron and molybdenum salts, such as ferric nitrate and ammonium molybdate. Where the fibril-forming metal is incorporated onto magnesia particles in fibril aggregates or carbon particles, the aqueous solution of fibril-forming metal contains from 0.01 to 1 preferably 0.2 to 0.5, gram of iron and from 0.005 to 0.25, preferably 0.05 to 0.1, gram of molybdenum per gram of fibril-forming catalyst and the slurry of magnesia particles and fibril aggregates or carbon particles contains from 0.01 to 1, preferably from 0.2 to 0.5, gram of magnesia and from 0.01 to 0.9, preferably 0.4 to 0.7 gram of fibril aggregates or carbon particles per gram of supported fibril-forming catalyst. The homogeneity of the resulting catalyst is evident upon filtration. A well-dispersed, homogeneous solid catalyst has a regular coloration, while poorly dispersed catalysts, which undergo partial separation of solid components on filtering, have black and gray striations in the filter cake.

Fine aqueous dispersion of magnesia is possible because of a physical attraction between the magnesium oxide/hydroxide and the fibril surface. However, dispersability also depends on the starting material from which the magnesia dispersion is prepared. If the density of the magnesium oxide is too high or the dispersibility is too low, non-homogeneous catalysts can result. Therefore, procedures to fully disperse or homogenize the fibril aggregates and magnesium oxide must be undertaken before neutralization of the iron or iron and molybdenum oxides is carried out. Such methods of dispersion or homogenization are known to the art.

Where alumina is used, catalysts can be made by dispersing fibril aggregates in water and coprecipitating the oxides of iron, aluminum and molybdenum from a solution containing ferric nitrate, aluminum nitrate and ammonium molybdate while maintaining the pH at 6.0±0.5 by concurrent addition of a solution of ammonium carbonate. The homogeneity of the catalyst is excellent as judged by coloration.

The supported fibril-forming catalyst of the invention comprises from about 1 to about 70 weight percent, preferably from 5 to 50 weight percent and more preferably from 12 to 40 weight percent, of iron or iron and molybdenum; from 1 to 95 weight percent, preferably from 10 to 85 weight percent and more preferably from 20 to 80 weight percent, of alumina and/or magnesia; and from 1 to 90 weight percent, preferably from 20 to 70 weight percent and more preferably from 30 to 50 weight percent, of carbon fibril aggregates or carbon particles based on the total supported fibril-forming catalyst weight, with the proviso that the total weight percent of iron or iron and molybdenum alumina or magnesia and carbon fibril aggregates or carbon particles does not exceed 100 weight percent.

The carbon fibrils of the invention that are made using the more preferred supported fibril-forming catalysts have extremely high purity, as made—to the extent that they are essentially pure carbon. In these carbon fibrils the impurity level from the fibril-forming catalytic metal is not more than about 1.1 weight percent, that from the alumina or magnesia support is not more than about 5 weight percent and the total impurity level is not more than about 6 weight percent. This provides a higher purity product. The previous levels of impurities in making fibrils were about 1.5 weight percent from the fibril-forming catalytic metal, about 8.5 weight percent from the alumina or magnesia support and about 10 weight percent for total impurities. The purity of the fibrils as made in the invention reduces the amount of washing needed to prepare the fibrils for sale and their cost. The impurities from the fibril-forming catalytic metal occur mainly as particles of metal that have been encapsulated within the carbon fibril so that they are not exposed.

The inventions are further described in connection with the examples.

EXAMPLES I–IV describe methods for making fibril aggregates having bird nest, combed yarn and open net morphologies by methods known prior to the invention.

EXAMPLES V–VIII are examples of the invention using carboxylate wash steps and they are comparative with EXAMPLES I–IV, respectively.

EXAMPLE IX describes an experiment to determine the optimum amount of carboxylate.

EXAMPLE X describes a method of coprecipitating a catalyst and support.

EXAMPLE XI describes production of a fibril aggregate-supported, coprecipitated catalyst.

EXAMPLE 1

This example describes the preparation of a catalyst for making bird nest (BN) fibril aggregates.

A slurry of 800 grams of a gamma alumina (available from Degussa as Oxide C) and 10 liters of deionized water was made up in a multi-neck, 22 liter indented flask with rapid stirring. The pH of the slurry was adjusted to 6.0.

A solution A was made by mixing 52 grams of ammonium molybdate [$(NH_4)_6 Mo_7O_{24} \cdot 4H_2O$], dissolved in 500 milliliters of deionized water and 1500 grams of 41% ferric nitrate [$Fe(NO_3)_3$] solution (9.5% Fe). Solution A and a 20% by weight ammonium carbonate solution (Solution B) were added concurrently with rapid mixing to maintain the pH at 6.0±0.5. The pH was controlled by the relative rates of addition of Solution A and Solution B. A silicone defoamer ANTIFOAM 289 available from Sigma Chemical was added in 5–300 ppm to suppress foaming during precipitation. The addition took about one hour, after which the resulting slurry was vacuum filtered using Number 50 Whatman filter paper. The filter cake was washed thoroughly twice by reslurrying in portions in a Waring blender for two minutes at medium speed with a total volume of 8 liters of deionized water followed by vacuum filtering. The conductivity of the second wash was about 1 mMho. The filter cake was dried at 162° C. in a convection oven overnight. Samples were ground to –100 mesh and tested for productivity.

The productivities of the catalyst for producing carbon fibrils was determined in a 1 inch quartz tube reactor using the following procedure: A 1 inch quartz tube was fitted with a ¼ inch thermocouple tube inserted through the bottom. At the tip of the thermocouple tube a plug of quartz wool that had been previously weighed was placed which permitted passage of gas, but not particles of catalyst or fibrils growing on the catalyst. The top of the quartz tube was fitted with a gas line which allowed for a downflow addition of one or more gases, and a modified ball valve which allowed addition of a given charge of powdered catalyst. One opening of the ball was closed off so that it became a cup or sealed cylinder. Catalyst could then be loaded into the cup and the valve assembly sealed. The contents of the cup could then be added to the gas stream without air contamination by turning the valve.

A thermocouple was inserted upward into the thermocouple tube to monitor the reactor temperature. The tube reactor was heated to 680° C. in an Argon stream to purge the reactor after which the gas stream was switched to a mixture of hydrogen and ethylene at a flow rate of 400 and 200 cc/min under standard conditions. A weighed charge of catalyst (about 0.02–0.05 g) was dropped into the downflow gas onto the quartz plug. The reactor was maintained at temperature for the about 20 minutes, after which the reactor was cooled in argon and emptied The weight of carbon fibrils produced was calculated from the total recovered weight and the known weights of the quartz wool plug and the catalyst fed. The yield of carbon fibril, or productivity, was calculated as the weight of carbon produced per weight of catalyst or per weight of iron in the catalyst.

The yield based on catalyst was 19.5 and the yield based on iron content was 140.

EXAMPLE II

This example describes the preparation of a catalyst for making combed yarn (CY) fibril aggregates.

An aqueous slurry of a lightly calcined, finely ground hydrous alumina $[Al_2O_3 \cdot 3H_2O]$ (available from ALCOA as H705) was made in a 22 liter reactor from 800 grams of the alumina support with 10 liters of deionized water, the pH was adjusted to 6.0 and after 0.5 hr vigorous stirring, the oxides of Fe/Mo were deposited as described in Example I. Solution A was made from 52 grams ammonium molybdate in 500 cc of deionized water and 1500 g of a 41% solution of ferric nitrate (available from Blue Grass Chemicals). Solution B was a 20% by weight solution of ammonium carbonate.

Drying, washing and testing of the catalyst was carried out as previously described in Example I. The yield based on catalyst was 14.5 and the yield based on iron content was 103.

EXAMPLE III

This example describes the preparation of a catalyst for making combed yarn (CY) fibril aggregates.

An aqueous slurry of a lightly calcined, finely ground activated alumina (available from ALCOA as CP2X), was made with 20.0 g of the support in 300 cc of deionized water. The pH of the slurry was adjusted to 6.0 and the slurry was vigorously stirred for 0.5 hr. Ammonium heptamolybdate, 1.35 g, was dissolved in 25 cc of deionized water. Ferric nitrate nonahydrate, 29.9 g, was dissolved in 100 cc of deionized water The two solutions were then mixed with stirring to form Solution A. As in previous examples, the mixed Fe/Mo oxides were deposited into the support by concurrent addition of Solution A and a 20 wt % solution of ammonium carbonate at relative rates sufficient to maintain the pH of the slurry at 6.0±0.5.

Drying, washing and testing of the catalyst was carried out as described in previous Examples. The yield based on catalyst was 13.2 and the yield based on iron content was 94.

Drying, washing and testing of the catalyst was carried out as previously described in Example I. The yield based on catalyst was 13.2 and the yield based on iron content was 94.

EXAMPLE IV

This example describes the preparation of a catalyst for making open net (ON) fibril aggregates.

An 800 g batch of finely ground magnesia (available from Martin-Marietta) was slurried with 12.5 liters of deionized water and heated to 75° C. for 2 hrs with vigorous stirring. The heat was turned off and the slurry allowed to cool.

58.4 grams of ammonium molybdate $[(NH_4)_6 Mo_7O_{24} \cdot 4H_2O]$ were dissolved in 300 ml of deionized water and the solution was mixed with 1824 grams of 41% by weight ferric nitrate solution. This solution was added to the slurry with vigorous stirring. The pH of the slurry remained relatively constant at about 10.5–11.0 during the addition. The resulting slurry having red-brown color was filtered and washed twice with a total of 40 litters of deionized water as in Example I and dried at 162° C. overnight. The dried catalyst was calcined at 400° C. in a convection oven for 4 hrs, ground and sieved to −100 mesh and tested in the 1 inch quartz tube reactor using the procedure described in Example I. The yield based on catalyst was 11.4 and the yield based on iron was 54.

EXAMPLE V

This example describes the improved performance of catalysts for making bird nest (BN) fibril aggregates that have been carboxylate-treated.

An aqueous slurry of 800 grams of gamma alumina (available from Degussa as Oxide C) with 10 liters of deionized water was prepared as in Example I, after which 302 grams of 65% ammonium acetate aqueous solution (196 grams active ammonium acetate available from HEICO Chemicals) was added. Additionally, 3 grams of a silicone defoamer ANTIFOAM 289 available from Sigma Chemical was added. The slurry was stirred vigorously for 30 minutes, after which the method described in Example I was resumed to deposit the Fe/Mo oxides. Drying, washing and testing were done in the same way. The acetate-to-iron mole ratio was 1. The yield based on catalyst was 22.3 and the yield based on iron content was 160 .

EXAMPLE VI

This example describes the improved catalyst performance of catalysts for making combed yarn (CY) fibril aggregates that have been carboxylate-treated.

A slurry was made with 800 grams of lightly calcined alumina support as described in Example II, after which 450 grams of 65% by weight ammonium acetate was added and the procedure of Example II resumed. The yield based on catalyst was 34.2 and the yield based on iron content was 244.

EXAMPLE VII

This example describes the improved performance of catalysts for making combed yarn (CY) fibril aggregates that: have been obtained with catalysts that have been carboxylate-treated.

A 20.7 g sample of the lightly calcined activated alumina used in Example III was slurred in 300 cc of deionized water containing 5.1 g ammonium acetate. The pH of the slurry was adjusted to 6.0 and the slurry was stirred vigorously for 0.5 hr. The procedure in Example III was then followed using 39.2 g of 41% ferric nitrate solution and 1.3 g ammonium heptamolybdate.

The yield based on catalyst was 18.2 and the yield based on iron was 130.

EXAMPLE VIII

This example describes the improved performance of catalysts for making open net (ON) fibril aggregates that have been carboxylate-treated.

The procedure in Example IV was repeated, except that the wash liquid was a 1 N solution of ammonium acetate. The rest of the procedure remained the same.

The yield based on catalyst was 21.9 and the yield based on iron was 76.

The comparisons between Examples I and V, II and VI, III and VII and IV and VIII, respectively, are set forth in Table 1

TABLE 1

| EXAMPLE | Acetate/Fe (Wt Ratio) | Morphology | YIELD Catalyst | Iron |
|---|---|---|---|---|
| I | 0 | BN | 19.5 | 140 |
| V | 1.4 | BN | 22.3 | 160 |
| II | 0 | CY | 14.5 | 103 |
| VI | 2.1 | CY | 34.2 | 244 |
| III | 0 | CY | 13.2 | 94 |
| VII | 1.4 | CY | 18.3 | 130 |
| IV | 0 | ON | 11.4 | 54 |
| VIII | N.A. | ON | 21.9 | 76 |

EXAMPLE IX

This example describes protocols for establishing the optimum amount and conditions of acetate treatment.

The optimum concentration for activation by ammonium acetate was determined by varying the molar ratio of acetate ion to ferric ion in the preparation procedure for making a combed yarn (CY) aggregate and then measuring the productivities of the resulting catalysts. Productivities were determined by the procedure described Example I.

The productivities of the various catalysts for producing carbon fibrils was determined in a one inch quartz tube reactor using the procedure described in Example I.

The optimum concentration was determined for the CY catalyst made from a calcined, hydrous alumina support and is show in Table 2.

TABLE 2

| RUN # | Acetate/Fe (Wt Ratio) | Fe (%) | YIELD (catalyst) | YIELD (Iron) |
|---|---|---|---|---|
| 1 | 0.28 | 13.9 | 18.4 | 132 |
| 2 | 0.56 | 13.7 | 21.0 | 153 |
| 3 | 1.4 | 13.7 | 35.6 | 260 |
| 4 | 1.75 | 13.6 | 36.6 | 269 |
| 5 | 2.18 | 13.4 | 34.5 | 257 |
| 6 | 2.8 | 13.4 | 37.2 | 277 |
| 7 | 5.2 | 13.4 | 26.9 | 201 |
| 8 | 4.9 | 15.4 | 20.8 | 135 |

EXAMPLE X

This example describes the coprecipitation of the mixed metal oxide catalyst with alumina in the preparation of fibril-forming catalysts.

Fresh solutions of 25 grams of ammonium molybdate $[(NH_4)_6 Mo_7O_{24} \cdot 4H_2O]$, (available from GFS Chemicals) in 500 ml of deionized water and 489 grams of ferric nitrate nonahydrate $[Fe(NO_3)_3 \cdot 9H_2O]$ (available from J. T. Baker in reagent grade) in 0.5 liters of deionized water were prepared and mixed with rapid to give a clear, dark red-brown solution. This was then mixed with 816 grams of a 60% by weight solution of aluminum nitrate nonahydrate $[Al(NO_3)_3 \cdot 9H_2O]$ (available from Mineral Research Development in technical grade). As needed, several drops of 10% nitric acid were added until totally clear. This solution was referred to as Solution A.

A multineck 5 liter indented flask fitted with a mechanical stirrer and a pH meter was used for the co-precipitation of aluminum and iron oxides at ambient temperature. Two liters of deionized water were added to the flask and the pH was adjusted to 6.0. Solution A and a 25% solution of ammonium carbonate (Solution B) were added concurrently with rapid mixing to maintain the pH at 6.0±0.5. The pH was controlled by the relative rates of addition of the two streams. The addition took about 1 hour, after which the resulting slurry was vacuum filtered through No. 50 Whatman filter paper. The filter cake was washed thoroughly twice by reslurrying in portions in a Waring blender for 2 minutes at medium speed with a total of 8 liters of deionized water followed by vacuum filtering. The conductivity of the effluent after the second wash was about 1 mMho.

The filter cake was dried at 180° C. overnight in a convection oven. The yield of dried catalyst was 194 grams with a calculated composition of 49.8% $Fe_2O_3$, 10.5% $MoO_3$ and 39.7% $Al_2O_3$. The dried catalyst was ground, sieved to −100 mesh and tested in the 1 inch tubular reactor described in Example I by the standard procedure described in that example. Two samples gave yields after 20 min. of 43.5 and 42.8 based on catalyst. The iron content on the catalyst was 34.8% and the yield based on iron was 124.

Table 3 shows the results of a series of catalysts prepared with different $Fe_2O_3/Al_2O_3$ and Fe/Mo weight ratios.

TABLE 3

| | Co-Precipitated Catalysts | | | | | | |
|---|---|---|---|---|---|---|---|
| | COMPOSITION (%) | | | | | | |
| | | | | | | Fe/Mo | YIELD |
| Run # | Fe | $Fe_2O_3$ | $Al_2O_3$ | $MoO_3$ | $Fe_2O_3/Al_2O_3$ | (wgt.) | cat | Fe |
| 1 | 14 | 20 | 76 | 4 | .26 | 5 | 11.7 | 85 |
| 2 | 34 | 49 | 40 | 11 | 1.23 | 5 | 39 | 114 |
| 3 | 55 | 78 | 6 | 16 | 13 | 5 | 21 | 38 |
| 4 | 37 | 53 | 36 | 11 | 1.47 | 5 | 41 | 111 |

TABLE 3-continued

Co-Precipitated Catalysts

| | COMPOSITION (%) | | | | | Fe/Mo | YIELD | |
|---|---|---|---|---|---|---|---|---|
| Run # | Fe | $Fe_2O_3$ | $Al_2O_3$ | $MoO_3$ | $Fe_2O_3/Al_2O_3$ | (wgt.) | cat | Fe |
| 5 | 37 | 53 | 47 | 0 | 1.13 | NA | 24 | 65 |
| 6 | 39 | 56 | 32 | 12 | 1.75 | 5 | 45 | 114 |
| 7 | 41 | 59 | 35 | 6 | 1.69 | 10 | 45 | 110 |
| 8 | 37 | 53 | 44 | 3 | 1.20 | 20 | 46 | 124 |
| 9 | 35 | 50 | 40 | 10 | 1.25 | 5 | 43 | 123 |

The optimum $Fe_2O_3/Al_2O_3$ weight ratio appeared to be in the range from 1–2 with a peak near 1.2. The optimum Fe/Mo weight ratio appeared to be a plateau ranging from 5–20.

Electron Microscopy (STEM) showed the fibrils produces to be predominantly (>99%) carbon fibril. The morphology of the aggregate was bird nest.

EXAMPLE XI

This example describes the preparation of a fibril aggregate-supported catalyst containing the mixed oxides of Fe,Mo and Al for making carbon fibril aggregates of a bird nest morphology.

A slurry of 28.5 grams of carbon fibrils was made with 500 milliliters of deionized water using a Waring blender for 2 minutes at high speed. The slurry was transferred to a multi-neck, indented 2 liter flask using another 500 milliliters of deionized water. The slurry concentration after transfer was about 2.8% by weight. The pH was adjusted to 6.0 and the slurry was stirred vigorously with a mechanical stirrer for 0.5 hour at ambient temperature.

Ammonium molybdate [$(NH_4)_6Mo_7O_{24} \cdot 4H_2O$] (3.9 grams) was fully dissolved in 50 milliliter of deionized water and mixed with 75.8 grams of a 40.0% by weight solution of ferric nitrate (available from Blue Grass Chemical,) (Fe content =9.25%, by weight.) This solution was then added to 122.5 grams of 60)% (by weight) aluminum nitrate nonahydrate (available from Mineral Res. Devel.) to form Solution A. As needed, a few drops of 10% nitric acid were added to clarify the solution completely.

Solution A and a 20% by weight solution of ammonium carbonate (Solution B) in deionized water were added concurrently to the slurry with vigorous stirring. The pH of the slurry was maintained at 6.0±0.5 by controlling the addition of the two streams.

The solids were then vacuum filtered using No. 50 Whatman filter paper and the recovered cake was washed twice b) reslurrying with 1 liter of deionized water in a Waring blender and refiltering. The filter cake was dried at 180° C. overnight. Yield of dry catalyst was 49.2 grams with a calculated composition of 58.0% carbon, 20.4% $Fe_2O_3$, 6.5% $MoO_3$ and 15.1% $Al_2O_3$. A sample of the dry catalyst was ground and sieved to −100 mesh and tested in the 1 inch tube reactor described in Example I. The fibril yield was 21.0 based on catalyst and 1.48 based on Fe.

The results for this catalyst are given in Table 4, as follows:

TABLE 4

FIBRILS AS SUPPORT

| COMPOSITION (%) | | | | | | YIELD | |
|---|---|---|---|---|---|---|---|
| Fe | $Fe_2O_3$ | $MoO_3$ | $Al_2O_3$ | MgO | C[1] | cat | Fe |
| 14.2 | 20.4 | 6.5 | 15.1 | 0 | 58.0 | 21.0 | 148 |

[1]As bird nest carbon fibril aggregate.

Electron microscopy indicated that fibrils grown in all cases were predominantly bird nest (BN) fibril aggregates. Newly grown carbon fibril aggregate could not be distinguished from those that were catalyst supports.

What is claimed is:

1. A method for the manufacture of carbon fibrils comprising passing a fibril-forming feed stock under temperature and pressure conditions suitable for formation of fibrils over a fibril-forming catalyst, wherein said fibril-forming catalyst is produced by a method comprising contacting a carboxylate, in an amount effective to enhance the yield of carbon fibrils produced over the yield which would be produced without said carboxylate, with said fibril-forming catalyst, wherein said fibril-forming catalyst comprises at least one fibril-forming catalyst metal from a metal-containing inorganic precursor compound and said carboxylate is from a carboxylate precursor, said metal-containing precursor compound being different from the carboxylate, said metal-containing precursor compound also being different from the carboxylate precursor.

2. A carbon fibril material made by the steps of passing a fibril-forming feed stock under temperature and pressure conditions suitable for formation of fibrils over a fibril-forming catalyst, wherein said fibril-forming catalyst is produced by a method comprising contacting a carboxylate, in an amount effective to enhance the yield of carbon fibril produced over the yield which would be produced without said carboxylate, with said fibril-forming catalyst, wherein said fibril-forming catalyst comprises at least one fibril-forming catalyst metal from a metal-containing inorganic precursor compound and said carboxylate is from a carboxylate precursor, said metal-containing precursor compound being different from the carboxylate, said metal-containing precursor compound also being different from the carboxylate precursor.

3. A method for production of carbon fibrils comprising passing a fibril-forming feedstock under temperature and pressure conditions suitable for formation of fibrils over a supported fibril-forming catalyst made by a process comprising the steps of:

(a) forming an aqueous solution of a compound of a metal having fibril-forming catalytic properties and an aluminum and/or magnesium compound; and (b) coprecipitating the compound of the fibril-forming metal and the aluminum and/or magnesium compound in the presence of a carboxylate in an amount effective to enhance the yield of carbon fibrils produced over the yield which would have been produced without said carboxylate, wherein said carboxylate is derived from a carboxylate precursor compound and said metal is derived from a metal-containing inorganic precursor compound, and wherein said metal-containing precursor compound and said carboxylate precursor compound are different compounds.

4. A carbon fibril material made by passing a fibril-forming feedstock under temperature and pressure conditions suitable for formation of fibrils over a supported fibril-forming catalyst made by a process comprising the steps of:

(a) forming an aqueous solution of a compound of a metal having fibril-forming catalytic properties and an aluminum and/or magnesium compound, and (b) coprecipitating the compound of the fibril-forming metal and the aluminum and/or magnesium compound in the presence of a carboxylate, in an amount effective to enhance the yield of carbon fibrils produced over the yield which would have been produced without said carboxylate, wherein said carboxylate is derived from a carboxylate precursor compound and said metal is derived from a metal-containing inorganic precursor compound, and wherein said metal containing precursor compound and said carboxylate precursor compound are different compounds.

5. A method for production of carbon fibrils comprising passing a fibril-forming feedstock under temperature and pressure conditions suitable for formation of fibrils over a supported fibril-forming catalyst made by a process comprising the steps of:

(a) forming an aqueous mixture comprising:

(i) an aqueous solution of an iron compound or iron and molybdenum compounds and an aluminum and/or magnesium compound, and (ii) a slurry of an aggregate of carbon fibrils, a preponderance of said fibrils having a length to diameter ratio of at least five, an external diameter of from 3.5 to 75 nanometers and being substantially free of pyrolytically deposited carbon, and (b) coprecipitating the aluminum and/or magnesium compound and the iron compound or iron and molybdenum compounds onto the fibril aggregate in the presence of a carboxylate in an amount effective to enhance the yield of carbon fibrils produced over the yield which would have been produced without said carboxylate, wherein said iron or iron and molybdenum compounds are derived from metal-containing precursor compounds and said carboxylate is derived from a carboxylate precursor compound, and wherein the metal-containing inorganic precursor compounds and said carboxylate precursor compound are different compounds.

6. A carbon fibril material made by the steps of passing a fibril-forming feedstock under temperature and pressure conditions suitable for formation of fibrils over a supported fibril-forming catalyst made by a process comprising the steps of:

(a) forming an aqueous mixture comprising:

(i) an aqueous solution of an iron compound or iron and molybdenum compounds and an aluminum and/or magnesium compound, and (ii) a slurry of an aggregate of carbon fibrils, a preponderance of said fibrils having a length to diameter ratio of at least five, an external diameter of from 3.5 to 75 nanometers, said fibrils and being substantially free of pyrolytically deposited carbon, and (b) coprecipitating the aluminum and/or magnesium compound and the iron compound or iron and molybdenum compounds onto the fibril aggregate, wherein said iron or iron and molybdenum compounds are derived from metal-containing inorganic precursor compounds and said carboxylate is derived from a carboxylate precursor compound, and wherein the metal-containing precursor compounds and said carboxylate precursor compound are different compounds.

7. A method for the production of carbon fibrils comprising passing a fibril-forming feedstock under temperature and pressure conditions suitable for formation of fibrils over a supported fibril-forming catalyst made by a process comprising the steps of:

(a) forming an aqueous solution of an iron compound or iron and molybdenum compounds;

(b) forming a slurry of alumina and/or magnesia particles and aggregates of carbon fibrils, a preponderance of said fibrils having a length to diameter ratio of at least five, an external diameter of from 3.5 to 75 nanometers, and said fibrils being substantially free of pyrolytically deposited carbon; and (c) adding the aqueous solution and the slurry together and thereby incorporating the iron compound or iron and molybdenum compounds onto said alumina and/or magnesia particles within said fibril aggregates in the presence of carboxylate in an amount effective to enhance the yield of carbon fibrils produced over the yield which would have been produced without said carboxylate, wherein said iron or iron and molybdenum compounds are derived from metal-containing inorganic precursor compounds and said carboxylate is derived from a carboxylate precursor compound, and wherein the metal-containing precursor compounds and said carboxylate precursor compound are different compounds.

8. A carbon fibril material made by the steps of passing a fibril-forming feedstock under temperature and pressure conditions suitable for formation of fibrils over a supported fibril-forming catalyst made by a process comprising the steps of:

(a) forming an aqueous solution of an iron compound or iron and molybdenum compounds;

(b) forming a slurry of alumina and/or magnesia particles and aggregates of carbon fibrils, a preponderance of said fibrils having a length to diameter ratio of at least five, an external diameter of from 3.5 to 75 nanometers, and said fibrils being substantially free of pyrolytically deposited carbon; and (c) adding the aqueous solution and the slurry together and thereby incorporating the compound or iron and molybdenum compounds onto said alumina and/or magnesia particles within said fibril aggregates in the presence of a carboxylate in an amount effective to enhance the yield of carbon fibrils produced over the yield which would have been produced without said carboxylate, wherein said iron or iron and molybdenum compounds are derived from metal-containing inorganic precursor compounds and said carboxylate is derived from a carboxylate precursor compound, and wherein the metal-containing precursor compounds and said carboxylate precursor compound are different compounds.

9. A method for production of carbon fibrils comprising passing a fibril-forming feedstock under temperature and pressure conditions suitable for formation of fibrils over a supported fibril-forming catalyst made by a process comprising the steps of:
   (a) forming an aqueous mixture comprising:
      (i) an aqueous solution of an iron compound or iron and molybdenum compounds and an aluminum and/or magnesium compound, and
      (ii) a slurry of carbon particles having an open pore structure with internal surface area; and
   (b) coprecipitating the aluminum and/or magnesium compound and the iron compound or iron and molybdenum compounds onto the carbon particles in the presence of a carboxylate in an amount effective to enhance the yield of carbon fibrils produced over the yield which would have been produced without said carboxylate,
   wherein said iron or iron and molybdenum compounds are derived from metal-containing inorganic precursor compounds and said carboxylate is derived from a carboxylate precursor compound, and wherein the metal-containing precursor compounds and said carboxylate precursor compound are different compounds.

10. A carbon fibril material made by the steps of passing a fibril-forming feedstock under temperature and pressure conditions suitable for formation of fibrils over a supported fibril-forming catalyst made by a process comprising the steps of:
   (a) forming an aqueous mixture comprising:
      (i) an aqueous solution of an iron compound or iron and molybdenum compounds and an aluminum and/,or magnesium compound, and
      (ii) a slurry of carbon particles having an open pore structure with internal surface area; and
   (b) coprecipitating the aluminum and/or magnesium compound and the iron compound or iron and molybdenum compounds onto the carbon particles in the presence of a carboxylate in an amount effective to enhance the yield of carbon fibrils produced over the yield which would have been produced without said carboxylate,
   wherein said iron or iron and molybdenum compounds are derived from metal-containing inorganic precursor compounds and said carboxylate is derived from a carboxylate precursor compound, and wherein the metal-containing precursor compounds and said carboxylate precursor compound are different compounds.

11. A method for the production of carbon fibrils comprising passing a fibril-forming feedstock under temperature and pressure conditions suitable for formation of fibrils over a supported fibril-forming catalyst made by a process comprising the steps of:
   (a) forming an aqueous solution of an iron compound or iron and molybdenum compounds;
   (b) forming a slurry of alumina and/or magnesia particles and carbon particles having an open pore structure with internal surface area; and
   (c) adding the aqueous solution and the slurry together and thereby incorporating a compound of the fibril-forming metal onto said alumina and/or magnesia particles within the carbon particles in the presence of a carboxylate in an amount effective to enhance the yield of carbon fibrils produced over the yield which would have been produced without said carboxylate,
   wherein said iron or iron and molybdenum compounds are derived from metal-containing inorganic precursor compounds and said carboxylate is derived from a carboxylate precursor compound, and wherein the metal-containing precursor compounds and said carboxylate precursor compound are different compounds.

12. A carbon fibril material made by passing a fibril-forming feedstock under temperature and pressure conditions suitable for formation of fibrils over a supported fibril-forming catalyst made by a process comprising the steps of:
   (a) forming an aqueous solution of an iron compound or iron and molybdenum compounds;
   (b) forming a slurry of alumina and/or magnesia particles and carbon particles having an open pore structure with internal surface area;
   (c) adding the aqueous solution and the slurry together and thereby precipitating a compound of the fibril-forming metal onto said alumina and/or magnesia particles within the carbon particles in the presence of a carboxylate in an amount effective to enhance the yield of carbon fibrils produced over the yield which would have been produced without said carboxylate,
   wherein said iron or iron and molybdenum compounds are derived from metal-containing inorganic precursor compounds and said carboxylate is derived from a carboxylate precursor compound, and wherein the metal-containing precursor compounds and said carboxylate precursor compound are different compounds.

13. A method for production of carbon fibrils comprising passing a fibril-forming feedstock under temperature and pressure conditions suitable for formation of fibrils over a supported fibril-forming catalyst comprising:
   (a) a catalyst support comprising an aggregate of carbon fibrils, a preponderance of said fibrils having a length to diameter ratio of at least five, an external diameter of from 3.5 to 75 nanometers and a wall thickness of 0.1 to 0.4 times the said external diameter, said fibrils having graphitic layers and being substantially free of pyrolytically deposited carbon; and
   (b) a catalytically effective amount of one or more metals having a fibril-forming catalytic properties supported on said aggregate; and
   (c) a carboxylate in an amount effective to enhance the yield of carbon fibrils produced over the yield which would have been produced without said carboxylate,
   wherein said carboxylate is derived from a carboxylate precursor compound and said metal is derived from a metal-containing inorganic precursor compound, and wherein said metal-containing precursor compound and said carboxylate precursor compound are different compounds.

14. The method of claim 1, wherein said carbon fibrils have a fibril-forming catalytic metal impurity level less than 1.1 weight percent.

15. The carbon fibril material of claim 2, wherein said fibrils have a fibril-forming catalytic metal impurity level less than 1.1 weight percent.

16. The method of claim 3, wherein said carbon fibrils have a fibril-forming catalytic metal impurity level less than 1.1 weight percent.

17. The carbon fibril material of claim 4, wherein said fibrils have a fibril-forming catalytic metal impurity level less than 1.1 weight percent.

18. The method of claim 5, wherein said carbon fibrils have a total impurity level less than 6 weight percent.

19. The carbon fibril material of claim 6, wherein said fibrils have a total impurity level less than 6 weight percent.

20. The method of claim 1, wherein said carboxylate is selected from the group consisting of acetate, formate or mixtures thereof.

21. The carbon fibril material of claim 2, wherein said carboxylate is selected from the group consisting of acetate, formate or mixtures thereof.

22. The method of claim 1, wherein the carboxylate comprises an anion of a water soluble carboxylic acid.

23. The method of claim 22, wherein the carboxylic acid is a substituted or unsubstituted mono-, di-, tri- or polycarboxylic acid.

24. The method of claim 22, wherein the carboxylic acid comprises a lower carboxylic acid of from 1 to 4 carbon atoms.

25. The method as recited in claim 22, wherein the carboxylic acid is selected from formic, acetic, propionic, butyric, oxalic, citric, malonic, glutaric, succinic or tartaric acid.

26. The method of claim 22, wherein the carboxylic acid is formic acid, acetic acid or a mixture of both.

27. The method as recited in claim 1, wherein the carboxylate is selected from a carboxylic acid or the sodium, potassium, ammonium or substituted quaternary ammonium salts of carboxylic acid.

28. The method of claim 1, wherein the carboxylate comprises an anion of a carboxylic acid and the weight ratio of said anion of carboxylic acid to said at least one fibril-forming catalyst metal is from 0.07 to 14.

29. The method of claim 28, wherein the carboxylic acid is acetic acid and said fibril-forming metal comprises iron and the weight ratio of acetate to iron is from 0.1 to 5.

30. The method of claim 1, wherein the carboxylate comprises an anion of a carboxylic acid and the weight ratio of said anion of carboxylic acid to said at least one fibril-forming catalyst metal is from 1.4 to 5.2.

31. The method of claim 1, wherein the carboxylate comprises an anion of a carboxylic acid and said catalyst contains from about 0.04 to about 4 grams of the anion per gram of finished supported fibril-forming catalyst.

32. The method of claim 7, wherein the carboxylate comprises an anion of a carboxylic acid and the weight ratio of anion to iron or iron and molybdenum in the solution from which the iron compound or iron and molybdenum compounds is precipitated is in the range of 0.07 to 14.

33. The method of claim 7, wherein the carboxylate acetic acid, the aqueous solution includes an iron compound and the weight ratio of acetate to iron in the solution from which the iron compound is precipitated is in the range of 0.1 to 5.

34. The method of claim 7, wherein said aqueous solution contains from about 0.01 to about 1 gram of iron and from about 0.005 to about 0.25 gram of molybdenum per gram of carbon-fibril-forming catalyst and said slurry contains from about 0.01 to about 1 gram of alumina and/or magnesia and from about 0.01 to about 0.9 gram of aggregates per gram of finished supported fibril-forming catalyst.

35. The method of claim 3, wherein the carboxylate comprises an anion of a carboxylic acid and the aqueous solution contains from about 0.04 to about 4 grams of the anion per gram of finished supported fibril-forming catalyst.

36. The method of claim 3, wherein the carboxylate comprises an anion of a carboxylic acid and the aqueous solution contains from about 0.8 to about 2 grams of the anion per gram of finished supported fibril-forming catalyst.

37. The method of claim 1, wherein said precursor from which the carboxylate is derived is ammonium acetate.

38. The carbon fibril material of claim 2, wherein said precursor from which the carboxylate is derived is ammonium acetate.

39. A method for the production of carbon fibrils comprising:
(a) providing a supported carbon fibril-forming catalyst made by a process comprising the steps of:
(i) forming an aqueous solution of an inorganic salt of at least one carbon fibril forming metal and an aluminum and/or magnesium compound; and
(ii) coprecipitating a compound of said metal and a compound of said aluminum and/or magnesium in the presence of a water soluble carboxylate in an amount effective to enhance the yield of carbon fibrils produced over the yield which would have been produced without said carboxylate;
(b) calcining said supported catalyst;
(c) passing over said supported catalyst formed in step (b) a fibril-forming feedstock under temperature and pressure conditions suitable for formation of carbon fibrils; and
(d) recovering said carbon fibrils.

40. A carbon fibril material made by the method of claim 39, said carbon fibril having a fibril-forming catalytic metal impurity of less than 6.0 weight percent.

41. A method for the production of carbon fibrils comprising:
(A) providing a supported carbon fibril-forming catalyst made by a process comprising the steps of:
(a) forming an aqueous mixture comprising:
(i) an aqueous solution of an inorganic salt of iron or iron and molybdenum and an aluminum and/or magnesium compound, and
(ii) a slurry of an aggregate of carbon fibrils, a preponderance of said fibrils having a length to diameter ratio of at least five, an external diameter of from 3.5 to 75 nanometers and being substantially free of pyrolytically deposited carbon, and
(b) coprecipitating said aluminum and/or magnesium compound and an iron compound or iron and molybdenum compounds onto the fibril aggregate in the presence of a water soluble carboxylate in an amount effective to enhance the yield of carbon fibrils produced over the yield which would have been produced with said carboxylate;
(B) calcining said supported catalyst;
(C) passing over said supported catalyst formed in step (B) a fibril-forming feedstock under temperature and pressure conditions suitable for formation of carbon fibrils; and
(D) recovering said carbon fibrils.

42. A carbon fibril material made by the method of claim 41, said carbon fibril having a fibril-forming catalytic impurity of less than 1.1 weight percent.

43. A method for the production of carbon fibrils comprising:
(A) providing a supported carbon fibril-forming catalyst made by a process comprising the steps of:
(a) forming an aqueous solution of an inorganic salt of iron or iron and molybdenum;
(b) forming a slurry of alumina and/or magnesia particles and aggregates of carbon fibrils, a preponderance of said fibrils having a length to diameter ratio of at least five, an external diameter of from 3.5 to 75 nanometers, said fibrils being substantially free of pyrolytically deposited carbon; and (c) adding said aqueous solution and said slurry together, thereby incorporating a compound of said iron or a compound of said iron and molybdenum onto said alumina and/or magnesia particles within said fibril aggregates in the presence of a water soluble carboxylate in an amount effective to enhance the yield of carbon fibrils produced over the yield which would have been produced without said carboxylate;

(B) calcining said supported catalyst;

(C) passing over said supported catalyst formed in step (B) a fibril-forming feedstock under temperature and pressure conditions suitable for formation of carbon fibrils; and (D) recovering said carbon fibrils.

44. A carbon fibril material made by the method of claim 43, said carbon-fibril having a fibril-forming catalytic metal impurity of less than 1.1 weight percent.

45. A method for the production of carbon fibrils comprising:

(A) providing a supported fibril-forming catalyst made by a process comprising the steps of:
   (a) forming an aqueous mixture comprising:
      (i) an aqueous solution of an inorganic salt of iron or iron and molybdenum and an aluminum and/or magnesium compound, and
      (ii) a slurry of carbon particles having an open pore structure with internal surface area; and
   (b) coprecipitating a compound of said aluminum and/or magnesium and a compound of an iron or compounds of iron and molybdenum onto said fibril aggregate in the presence of a water soluble carboxylate in an amount effective to enhance the yield of carbon fibrils produced over the yield which would have been produced without said carboxylate;

(B) calcining said supported catalyst;

(C) passing over said supported catalyst formed in step (B) a fibril-forming feedstock under temperature and pressure conditions suitable for formation of carbon fibrils; and (C)(D) recovering said carbon fibrils.

46. A carbon fibril material made by the method of claim 45, said carbon fibril having a fibril-forming catalytic metal impurity of less than 1.1 weight percent.

47. A method for the production of carbon fibrils comprising:

(A) providing a supported fibril-forcing catalyst made by a process comprising the steps of:
   (a) forming an aqueous solution of an inorganic salt of iron or iron and molybdenum;
   (b) forming a slurry of alumina and/or magnesia particles and carbon particles having an open pore structure with internal surface area; and
   (c) adding said aqueous solution and said slurry together thereby incorporating a compound of the fibril-forming metal onto said alunina and/or magnesia particles within the carbon particles in the presence of a water soluble carboxylate in an amount effective to enhance the yield of carbon fibrils produced over the yield which would have been produced without said carboxylate;

(B) calcining said supported catalyst;

(C) passing over said supported catalyst formed in step (B) a fibril-forming feedstock under temperature and pressure conditions suitable for formation of carbon fibrils; and (D) recovering said carbon fibrils.

48. A carbon fibril material made by the method of claim 47, said carbon fibril having a fibril-forming catalytic metal impurity of less than 1.1 weight percent.

49. A method for the production of carbon fibrils comprising:

(A) providing a supported carbon fibril-forming catalyst which comprises:
   (a) a catalyst support comprising an aggregate of carbon fibrils, a preponderance of said fibrils having a length to diameter ratio of at least five, an external diameter of from 3.5 to 75 nanometers and a wall thickness of 0.1 to 0.4 times the said external diameter, said fibrils having graphitic layers and being substantially free of pyrolytically deposited carbon; and
   (b) a catalytically effective amount of one or more metals or metal compounds formed from an inorganic salt of said metal or metals having fibril-forming catalytic properties supported on said aggregate; end
   (c) a water soluble carboxylate in an amount effective to enhance the yield of carbon fibrils produced over the yield which would have been produced without said carboxylate;

(B) calcining said supported catalyst;

(C) passing over said supported catalyst formed in step (B) a fibril-forming feedstock under temperature and pressure conditions suitable for formation of carbon fibrils; and (D) recovering said carbon fibrils.

50. A method for the manufacture of carbon fibrils comprising:

(a) providing an inorganic salt of at least one carbon fibril forming metal;

(b) precipitating said metal or a compound of said metal onto a support forming a supported catalyst;

(c) contacting said supported catalyst with a water soluble carboxylate in amount effective to enhance the yield of carbon fibrils produced over the yield which would have been produced without said carboxylate;

(d) calcining said carboxylate treated supported catalyst;

(e) introducing said catalyst formed in step (d) to a fibril-forming feed stock under temperature and pressure conditions suitable for formation of carbon fibrils; and (f) recovering said carbon fibrils.

51. The method of claim 50, wherein said metal containing inorganic salt is selected from inorganic salts of iron, cobalt and nickel.

52. A method for the manufacture of carbon fibrils comprising:

(a) providing an inorganic salt of at least one carbon fibril forming metal;

(b) precipitating under controlled pH conditions said metal or a compound of said metal onto a support to form a supported catalyst;

(c) contacting said supported catalyst with a water soluble carboxylate in an amount effective to enhance the yield of carbon fibrils produced over the yield which would have been produced without said carboxylate;

(d) calcining said carboxylate treated supported catalyst;

(e) passing over said catalyst formed in step (d) a fibril-forming feed stock under temperature and pressure conditions suitable for formation of carbon fibrils; and (f) recovering said carbon fibrils.

53. A carbon fibril material made by the method of claim 50, said carbon fibril having a residual fibril-forming catalytic metal impurity of less than 6.0 weight percent.

54. A carbon fibril of essentially pure carbon having a carbon fibril-forming catalytic metal impurity level of not more than about 1.1 weight percent and having a length to diameter ratio of at least 5, an external diameter of from 3.5 to 75 nanometers, composed of graphitic layers and being substantially free of pyrolytically deposited carbon.

55. A carbon fibril of essentially pure carbon having a catalyst support impurity level of not more than about 5 weight percent and having a length to diameter ratio of at least 5, an external diameter of from 3.5 to 75 nanometers, composed of graphitic layers and being substantially free of pyrolytically deposited carbon.

56. A carbon fibril of essentially pure carbon having a total impurity level of not more than about 6 weight percent and having a length to diameter ratio of at least 5, an external diameter of from 3.5 to 75 nanometers, composed of graphitic layers and being substantially free of pyrolytically deposited carbon.

* * * * *

UNITED STATES PATENT AND TRADEMARK OFFICE
CERTIFICATE OF CORRECTION

PATENT NO. : 6,294,144 B1
DATED : September 25, 2001
INVENTOR(S) : Moy et al.

It is certified that error appears in the above-identified patent and that said Letters Patent is hereby corrected as shown below:

<u>Column 21, claim 33,</u>
Line 47, insert -- is -- between "carboxylate" and "acetic."

<u>Column 23, claim 45,</u>
Line 42, delete "(C)" at the beginning of the clause.

Signed and Sealed this

Twenty-sixth Day of March, 2002

Attest:

*Attesting Officer*

JAMES E. ROGAN
*Director of the United States Patent and Trademark Office*

UNITED STATES PATENT AND TRADEMARK OFFICE
CERTIFICATE OF CORRECTION

PATENT NO. : 6,294,144 B1
APPLICATION NO. : 08/464278
DATED : September 25, 2001
INVENTOR(S) : Moy et al.

It is certified that error appears in the above-identified patent and that said Letters Patent is hereby corrected as shown below:

Title Page: delete: "(*) Notice: This patent issued on a continued prosecution application filed under 37 CFR 1.53(d), and is subject to the twenty year patent term provisions of 35 U.S.C. 154(a)(2)."

Signed and Sealed this
Fifteenth Day of October, 2013

Teresa Stanek Rea
*Deputy Director of the United States Patent and Trademark Office*